(12) United States Patent
Su et al.

(10) Patent No.: US 8,756,358 B2
(45) Date of Patent: Jun. 17, 2014

(54) METHOD AND DEVICE FOR IDENTIFYING UNIVERSAL SERIAL BUS (USB) INSERTION OR CHARGER INSERTION OF MOBILE TERMINAL

(75) Inventors: Haibo Su, Huizhou (CN); Wenjun Zhang, Huizhou (CN)

(73) Assignee: Huizhou TCL Mobile Communication Co., Ltd, Huizhou, Guangdong (CN)

( * ) Notice: Subject to any disclaimer, the term of this patent is extended or adjusted under 35 U.S.C. 154(b) by 472 days.

(21) Appl. No.: 13/203,947

(22) PCT Filed: Jun. 25, 2010

(86) PCT No.: PCT/CN2010/074511
§ 371 (c)(1),
(2), (4) Date: Aug. 30, 2011

(87) PCT Pub. No.: WO2011/032410
PCT Pub. Date: Mar. 24, 2011

(65) Prior Publication Data
US 2011/0314201 A1 Dec. 22, 2011

(30) Foreign Application Priority Data
Sep. 19, 2009 (CN) .......................... 2009 1 0190232

(51) Int. Cl.
*G06F 13/00* (2006.01)
*H02J 7/00* (2006.01)

(52) U.S. Cl.
USPC .......................... 710/313; 713/300; 320/114

(58) Field of Classification Search
USPC ........... 713/300; 710/313; 320/107, 114, 137, 320/138, 162, 163
See application file for complete search history.

(56) References Cited

U.S. PATENT DOCUMENTS

2006/0181241 A1* 8/2006 Veselic ........................ 320/107
2011/0279080 A1* 11/2011 Fischer et al. ................ 320/107

FOREIGN PATENT DOCUMENTS

EP         002051348 A1 *  4/2009  ................ G06F 1/26
WO   WO 2006/102928 A1 * 10/2006  ................ H02J 7/00

* cited by examiner

*Primary Examiner* — Glenn A Auve
(74) *Attorney, Agent, or Firm* — Shimokaji & Associates P.C.

(57) ABSTRACT

The present invention discloses a method to identify whether a USB or a charger is plugged into a mobile terminal and an identification device thereof. The identification device comprises a USB interface module connected with an external power supply device, an interface detection and control module, an electronic switch module, a charging switch module, an identification module and a baseband USB data transceiving module. With the method to identify whether a USB or a charger is plugged into a mobile terminal and an identification device thereof provided by the present invention, when an external power supply is plugged in, the identification device makes the terminal to preferentially enter a USB mode, while, according to the ultimately detected D-signal state, interrupt responses can be flexibly generated to accurately determine the presence of a USB or a charger. It can quickly and accurately identify the type of USB or charger plugged into the terminal. The technology plays a particular important role for a 3G mobile phone terminal.

16 Claims, 3 Drawing Sheets

METHOD AND DEVICE FOR IDENTIFYING UNIVERSAL SERIAL BUS (USB) INSERTION OR CHARGER INSERTION OF MOBILE TERMINAL

FIELD OF THE INVENTION

The present invention relates to the field of mobile communication terminals, and more specifically, to a circuit to identify the presence of a plugged USB or a charger.

DESCRIPTION OF THE RELATED ART

With the promulgation of the new national standard for chargers, "Technical Requirements and Testing Methods for Chargers and Interfaces for Mobile Communication Handsets," in 2007, domestic cell phone chargers have been unified. In the new national standard, it is prescribed that connectors on the side of charging cables and chargers adopt USB A series plug, while there is no mandatory requirement for connectors on the side of cell phones.

Along with increasingly strengthened social awareness of environmental protection and energy saving, however, most terminal manufacturers began to gradually adopt the commonly used mini USB & USB A series USB cables when designing charging cables. The application of the common USB cable as a charging and data line for cell phone can maximize cost benefits and social benefits, such as energy saving and environmental protection.

When a user uses the common USB cable to charge with a charger or via a USB or to transmit USB data, the cell phone will determine whether it is a charger or a computer that has been plugged in. Currently, there are numerous methods to determine what is plugged in, by various terminal manufacturers and upstream development platforms, some of which make correct determinations but are complex, while others use simple methods but tend to reach incorrect determinations.

Conventional determination process: FIG. 1 is a schematic of the interface of a charger according to the new national standard. In the figure, the left interface is a supply of 50 Hz 220 Vac commercial power, and the right interface is the 5V direct current (DC) output terminal of the charger. It can be seen that D− and D+ interfaces of the charger's output are short circuited. Therefore, all determinations of charger or computer USB plug-in are made substantially around the characteristic, namely, when a charger is plugged in, the cell phone detects that D− and D+ have the same voltage and thereby determines that it is a charger that has been plugged in; when a computer USB is plugged in, the cell phone detects that D− and D+ have different voltages and thereby determines that it is a computer USB that has been plugged in.

However, the prior an has a drawback of misjudgment: data D+ and D− pins of standard USB mini ports and USB A port plugs are usually shorter than 5V and GND pins. When a cell phone is connected to a charger, either the cell phone is plugged into a mini port or a charger is plugged into an A port; the cell phone would determine it to be a USB plug-in and enter a USB mode if the user plugs in very slowly or only plugs in half way. Once the cell phone enters the USB mode, it will not come back to the charger mode even when the charging plug is completely plugged in later. The reason is because many terminal manufacturers or development platforms must perform a pullout determination before determining the next plug-in action. Therefore, different speeds of charger plug-in will make a cell phone enter different charging states. Those that are plugged in fast enter a mode of charging by a charger while those that are plugged in slowly enter a USB mode. The root cause is that many designs rail to fully consider the inconsistent lengths between D+ and D− pins in mini ports and A ports of a USB cable and 5V and GND pins, as well as different actual operations by users, thereby leading to misjudgment.

Therefore, the prior art is to be improved.

SUMMARY OF THE INVENTION

An object of the present invention is to provide a method to identify whether a USB or a charger is plugged into a mobile terminal and an identification device thereof, which can quickly and accurately identify the type of USB or charger plugged into the terminal.

In order to attain the above object, the present invention employs the following technical solution:

A device for identifying whether a USB or a charger is plugged into a mobile terminal, comprises an interface detection and control module; an electronic switch module; a charging switch module; an identification module; and a baseband USB data transceiving module; wherein the interface detection and control module is connected with a USB interface module and is adapted to detect D-port signal of the USB interface module; the interface detection and control module is adapted to generate interrupt responses according to changes of the D-port signal so as to output a corresponding control signal to the electronic switch module; the electronic switch module is connected with the USB interface module is adapted to receive input signals from the USB interface module; the electronic switch module is adapted to select the input signals according to the control signal to connect with the baseband USB data transceiving module or charging switch module; the charging switch module is connected with the electronic switch module and is adapted to switch and output an identification signal according to an output signal of the electronic switch module; and the identification module is connected with the USB interface module and charging switch module, respectively, the identification module is adapted to identify the type of the external power supply device according to signal states of the USB interface module and charging switch module.

The identification device further comprises a charging module connected with the USB interface module and charging switch module, respectively, and the charging module is adapted to select a corresponding charging method according to the type of the external power supply device identified by the identification module.

The identification device described above wherein the electronic switch module is an integrated chip with model number FSUB30L10; pin 1 (S control port) of the FSUB30L10 integrated chip is connected with the interface detection and control module; pin 9 (/OE port), pin 8 (HSD2− port) and pin 5 (GND port) are connected with reference ground; pin 4 is connected with D+ port of the USB interface module; pin 6 is connected with D− port of the USB interface module; and pin 3 (HSD2+ port) and pin 7 (HSD2− port) are connected with the baseband USB data transceiving module.

The identification device described above wherein the charging switch module comprises a field-effect transistor (FET) with model number SI8415 DB; S pole of the SI18415 DB FET is connected with pin 2 (HSD1+ port) of the FSUB30L10 integrated chip via a resistor R598; two D poles of the SI8415 DB FET are connected with the identification module and charging module; and G pole of the SI8415 DB FET is connected with reference ground via resistor R11 and resistor R590.

A method to identify whether a USB or a charger is plugged into a mobile terminal comprises detecting, with an interface detection and control module of the mobile terminal, that an external power supply device is plugged into a USB interface of the module device; initializing and outputting a first control signal, with the interface detection and control module, to control an electronic switch module to be connected with a baseband USB data transceiving module and to enter a USB mode; detecting, with an identification module, whether an output state of a charging switch module changes; if the output state of the charging switch changes, then a currently plugged power supply device is determined to be a computer's USB A series interface; and if the output state of the charging switch does not change, then the interface detection and control module detects whether a state of D-port signal of the USB interface module changes; if no changes, the interface detection and control module generates an interrupt and outputs a second control signal to control the electronic switch module to be connected with the charging switch module and to enter a charger working mode, while the currently plugged power supply device is a standard charger; if there is a change, the currently plugged power supply device is a non-standard charger.

The identification method described above wherein the first control signal is a high level signal.

The identification method described above wherein the second control signal is a low level signal.

A method to identify whether a USB or a charger is plugged into a mobile terminal comprises causing the mobile terminal to preferentially enter a USB mode when an external power supply is plugged into the mobile terminal; and generating interrupt responses according to an ultimately detected D-signal state to determine whether the USB or the charger is plugged into the mobile terminal.

The method described above wherein an interface detection and control module is connected with a USB interface module for detecting a D-port signal of the USB interface module.

The method described above wherein the USB interface module generates interrupt responses according to changes of the D-port signal so as to output a corresponding control signal to an electronic switch module, wherein the corresponding control signal comprises a first control signal and a second control signal.

The method described above wherein when the interface detection and control module detects that an external power supply device is plugged into the USB interface module, and the interface detection and control module initializes and outputs the first control signal to the electronic switch module, such that the terminal preferentially enters the USB mode The method described above wherein when the interface detection and control module detects changes to the D-port of the USB interface module, and the interface detection and control module generates an interrupt and outputs the second control signal to the electronic switch module, such that the mobile terminal enters a charger working mode.

The method further comprises receiving input signals from a USB interface module by an electronic switch module connected with the USB interface module.

The method further comprises selecting the input signals according to a control signal to connect with a baseband USB data transceiving module or a charging switch module, such that the mobile terminal enters a USB module or a charger working mode.

The method further comprises connecting a charging switch module with an electronic switch module for switching and outputting an identification signal according to an output signal of the electronic switch module.

The method further comprises identifying a type of external power supply device according to signal states of a USB interface module and a charging switch module.

DETAILED DESCRIPTION OF THE INVENTION

The present invention provides a method to identify whether a USB or a charger is plugged into a mobile terminal and an identification device thereof. To make the object, technical solution and advantages of the present invention clearer, the present invention is further described in detail below with reference to the accompanying drawings and embodiments.

Figure 1:
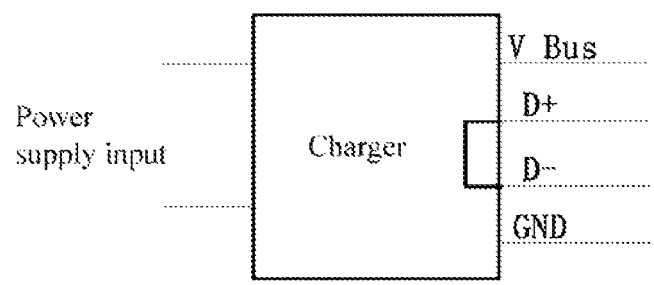
FIG. 1 is a schematic diagram illustrating short circuited signal wires D+ and D− in a standard charger.
Figure 2:
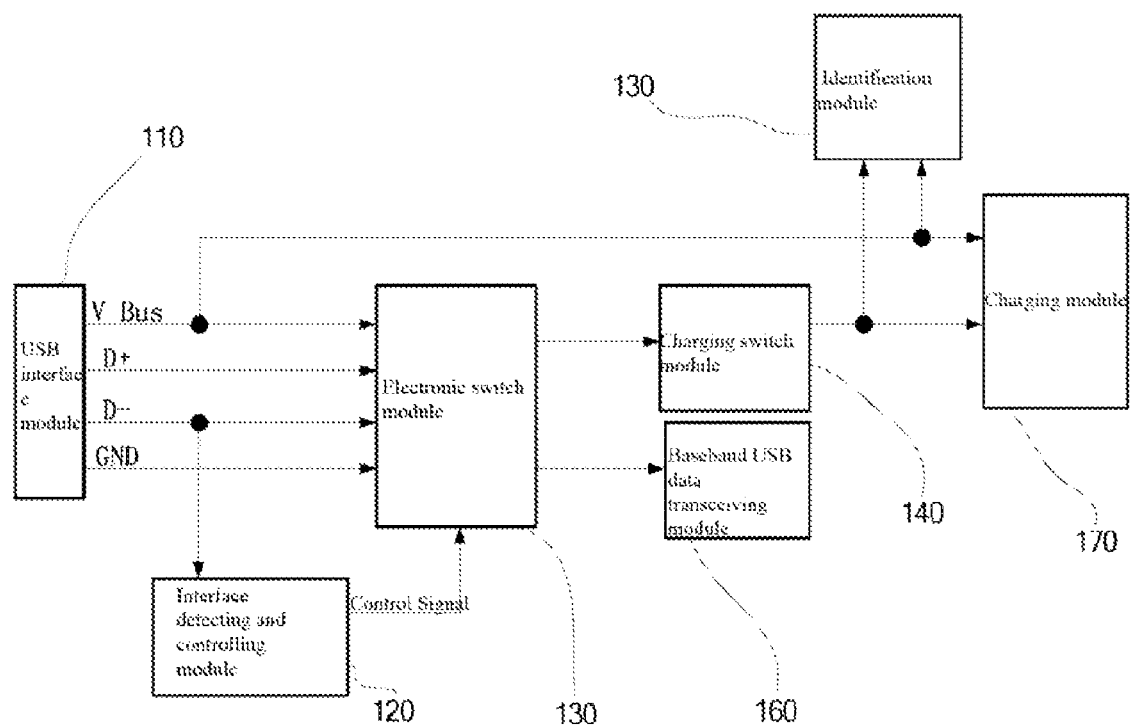
FIG. 2 is a block diagram of the identification device provided in an embodiment of the present invention.

As shown in FIG. 2, a device to identify whether a USB or a charger is plugged into a mobile terminal provided in Embodiment 1 of the present invention comprises a USB interface module 110 plugged into an external power supply device, the external power supply device comprises a standard charger or a USB data line connected with a computer; wherein, the identification device according to the present invention further comprises: an interface detection and control module 120, an electronic switch module 130, a charging switch module 140, an identification module 150 and a baseband USB data transceiving module 160.

The interface detection and control module 120 is connected with the USB Interface module 110 for detecting D-port signal of the USB interface module, and generating interrupt responses according to changes of the D-port signal so as to output a corresponding control signal to the electronic switch module 130; wherein the corresponding control signal comprises a first control signal and a second control signal. When the interface detection and control module 120 detects that an external power supply device is plugged into the USB interface module 110, the interface detection and control module 120 initializes and outputs a first control signal to the electronic switch, such that the terminal preferentially enters a USB mode; and when the interface detection and control module 120 detects changes to D-port of the USB interface module 110, the interface detection and control module 120 generates an interrupt and outputs a second control signal to the electronic switch 130, such that the terminal enters a charger working mode.

The electronic switch module 130 is connected with the USB interface module 110 for receiving input signals from the USB interface module 110, and selecting the input signals according to the control signal to connect with the baseband USB data transceiving module 160 or charging switch module 140, such that the terminal enters a USB module or a charger working mode.

The charging switch module 144) is connected with the electronic switch module 130 for switching and outputting an identification signal according to an output signal of the electronic switch module 430.

The identification module 150 is connected with the USB interface module 110 and charging switch module 140, respectively, for identifying the type of the external power supply device according to signal states of the USB interface module 110 and charging switch module 140.

As shown in FIG. 2, the device to identify whether a USB or a charger is plugged into a mobile terminal provided in Embodiment 1 of the present invention further comprises a charging module 170 connected with the USB interface module 110 and the charging switch module 140, respectively, and the charging module 170 is used for selecting a corresponding charging method according to the type of the external power supply device identified by the identification module 150 namely, the corresponding charging method comprises: a charging method in the working mode of a standard charger or a charging method of non-standard charger by connecting with a USB A series interface of a computer.

The principle of the device to identify whether a USB or a charger is plugged into a mobile terminal provided in Embodiment 1 of the present invention is shown in FIG. 2. When the interface detection and control module 110 of the mobile terminal detects that an external power supply device (computer USB cable or standard charger) is plugged into the USB interface module 110, the interface detection and control module 120 initializes and outputs a first control signal to control the electronic switch module 140 to be connected with the baseband USB data transceiving module 160 and preferentially enters a USB mode.

After preferentially entering the USB mode, if the identification module 150 detects that there is no change to the output state of the charging switch module 140, then the identification module 150 detects the output state of the charging switch module 140 is the same as the output state of the charging switch module 140 at the initialization by the interface detection and control module 120, the currently plugged power supply device is a computer's USB A series interface.

When the identification module 150 detects changes to the output state of the charging switch module 140: if at this time, the interface detection and control module 120 detects no more changes to the state of D-port signal of the USB interface module, then the interface detection and control module 120 generates an interrupt and outputs a second control signal to control the electronic switch module to be connected with the charging switch module and to enter a charger working mode, then the currently plugged power supply device is a standard charger; otherwise, the currently plugged power supply device is a non-standard charger.

Specific circuit structure of each of the above components is described in detail below with reference with FIG. 3.

Figure 3:
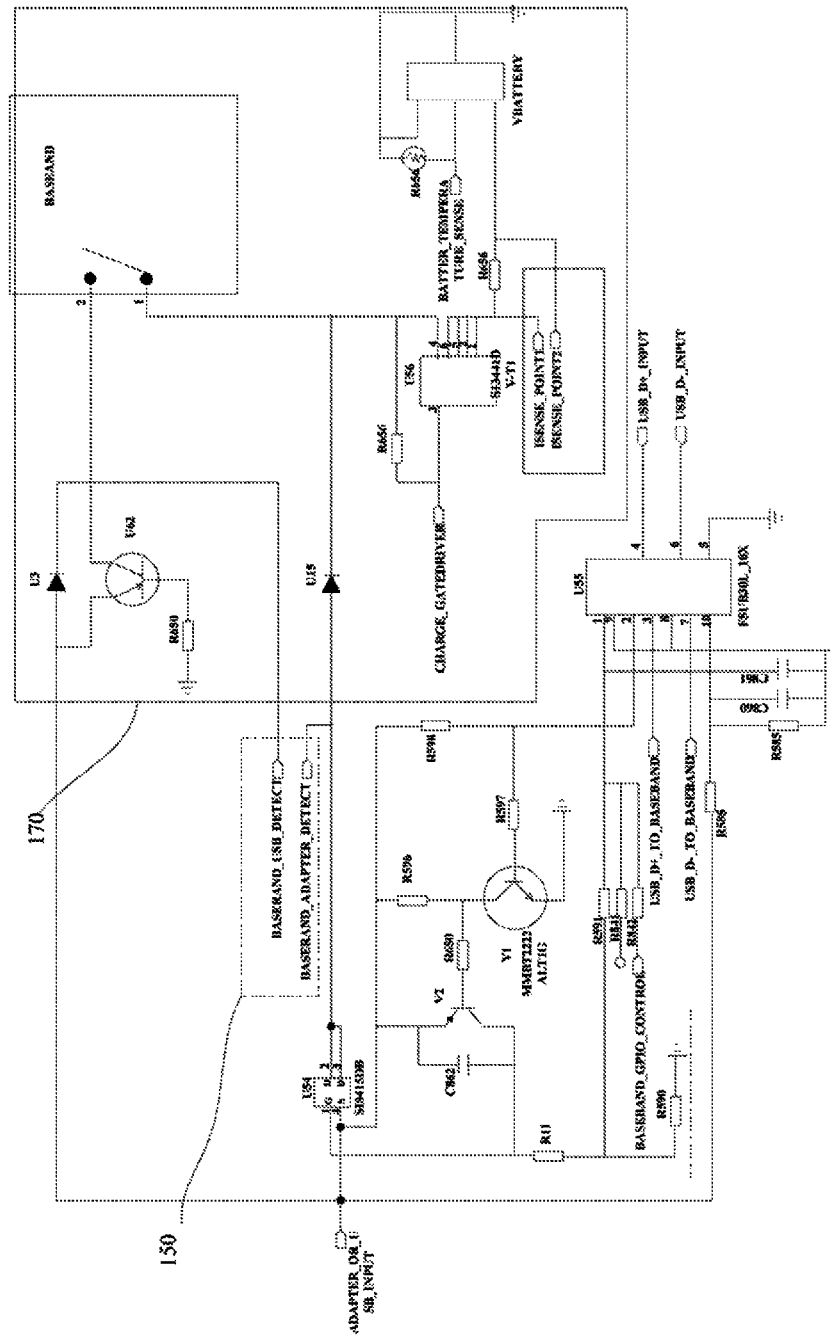
FIG. 3 is a specific circuit diagram of the identification device provided in an embodiment of the present invention.

The device to identify whether a USB or a charger is plugged into a mobile terminal provided in the embodiment of the present invention is shown in FIG. 3. The USB interface module 110 comprises: 5V power input terminal ADAPTER_OR_USB_INPUT, i.e. V Bus, D− input port USB_D−_IPPUT, and D+ input port USB_D+INPUT.

The electronic switch module 130 is an integrated chip U55 with model number FSUB30L10; pin 1 (S control port) of the FSUB30L10 integrated chip is connected with the BASEBAND_GPIO_CONTROL port of the interface detection and control module; pin 9 (/OE port), pin 8 (HSD2− port) and pin 5 (GND port) are connected with reference ground; pin 4 is connected with D+ port USB_D+_INPUT of the USB interface module; pin 6 is connected with D− port USB_D−_IPPUT of the USB interface module; and pin 3 (HSD2+ port) and pin 7 (HSD2− port) are connected with the baseband USB data transceiving module 160 via USB_D+_TO_BASEBAND port and USB_D−_TO_BASEBAND port, respectively.

The charging switch module 140 comprises a field-effect transistor (FET) with model number SI8415 DB; S pole of the SI8415 DB FET is connected with pin 2 (HSD1+ port) of the FSUB30L10 integrated chip via a resistor R598; two D poles of the SI8415 DB FET are connected with the identification module and charging module; and G pole of the SI8415 DB FET is connected with reference ground via resistor R11 and resistor R590.

The interface detection and control module 120 comprises an interface detection port (not shown) connected with D− input port USB_D−_IPPUT and a BASEBAND_GPIO_CONTROL control port connected with pin 1 (S control port) of the FSUB30L10 integrated chip.

The identification module 150 comprises BASERAND_USB_DETECT port and BASERAND_ADAPTER_DETECT.

When a charging power supply is plugged into a terminal system, some GPIO will be set to high level after completing initialization regardless of whether what is plugged in is a charger or a USB and whether the cell phone is on or not. The device to identify whether a USB or a charger is plugged into a mobile terminal provided in the embodiment of the present invention adopts this kind of GPIO (i.e. the BASEBAND_GPIO_CONTROL control port of the interface detection and control module in the figure) to connect with the "S" pin of U55 and to directly ground the "/OE" pin as shown in FIG. 3. Therein, the control logic of the FSUB30L10 integrated chip U55 is when "S" and "/OE" are both at low level. D+ and D− are connected with HSD1+ and HSD1−; and when "S" is at high level and "/OE" is at low level D+ and D− are connected with HSD2+ and HSD2−.

When the interface detection and control module 110 of the mobile terminal detects that an external power supply device (computer USB cable or standard charger) is plugged into the USB interface module 110, the interface detection and control module initializes, its BASEBAND_GPIO_CONTROL control port (GPIO) outputs a first control signal at high level, such that USB D+ (HSD2+) and D− (HSD2−) in the terminal system are connected with the interface's D+ and D− to create a physical connection channel for the terminal to enter the USB mode. If a USB is plugged in, the baseband_USB_detect port of the identification module 150 will detect the high level, while its baseband_adapter_detect port will detect low level, with which the terminal can determine that it is a USB plug-in, generates a USB plug-in interrupt response, and enters the USB mode: if a charger is plugged in, then, since D+ and D− of the charger interface are short circuited, the D+ signal is pulled up to 3.3V in the terminal baseband, the D− signal will therefore also be pulled up to 3.3V. At this time, the terminal's interface detection and control module 120 generates an interrupt response by detecting changes of the D− signal, and the BASEBAND_GPIO_CONTROL control port (GPIO) of the interface detection and control module outputs a second control signal at low level, i.e. set GPIO connected with the "S" pin of U55 (i.e. BASEBAND_GPIO_CONTROL control port in the figure) at low level, such that USB D+ (HSD2+) and D− (HSD2−) in the terminal system are cut off from the interface's D+ and D−, which subsequently cuts off the connection of USB signals from the baseband USB data transceiving module of the terminal with the external side, and connects HSD1+ and HSD1− pins of U55 with the charger interface's D+ and D−; at this time, HSD1+ is pulled to low level such that the U54 FET in the charging switch module opens, and at this time, an identification signal "baseband_adapter_detect" output by the charging switch module in FIG. 3 changes to high level, when the terminal's identification module detects that both "baseband_adapter_detect" and "baseband_USB_detect" are high level, it activates the second interrupt and enters a charger working mode.

The above description is the complete process to identify the plug-in of a charger or a USB. The terminal preferentially enters a USB mode through hardware when an external power supply is plugged in, while according to the ultimately detected D-signal state, interrupt responses can be flexibly generated to accurately determine USB or charger.

Figure 4:
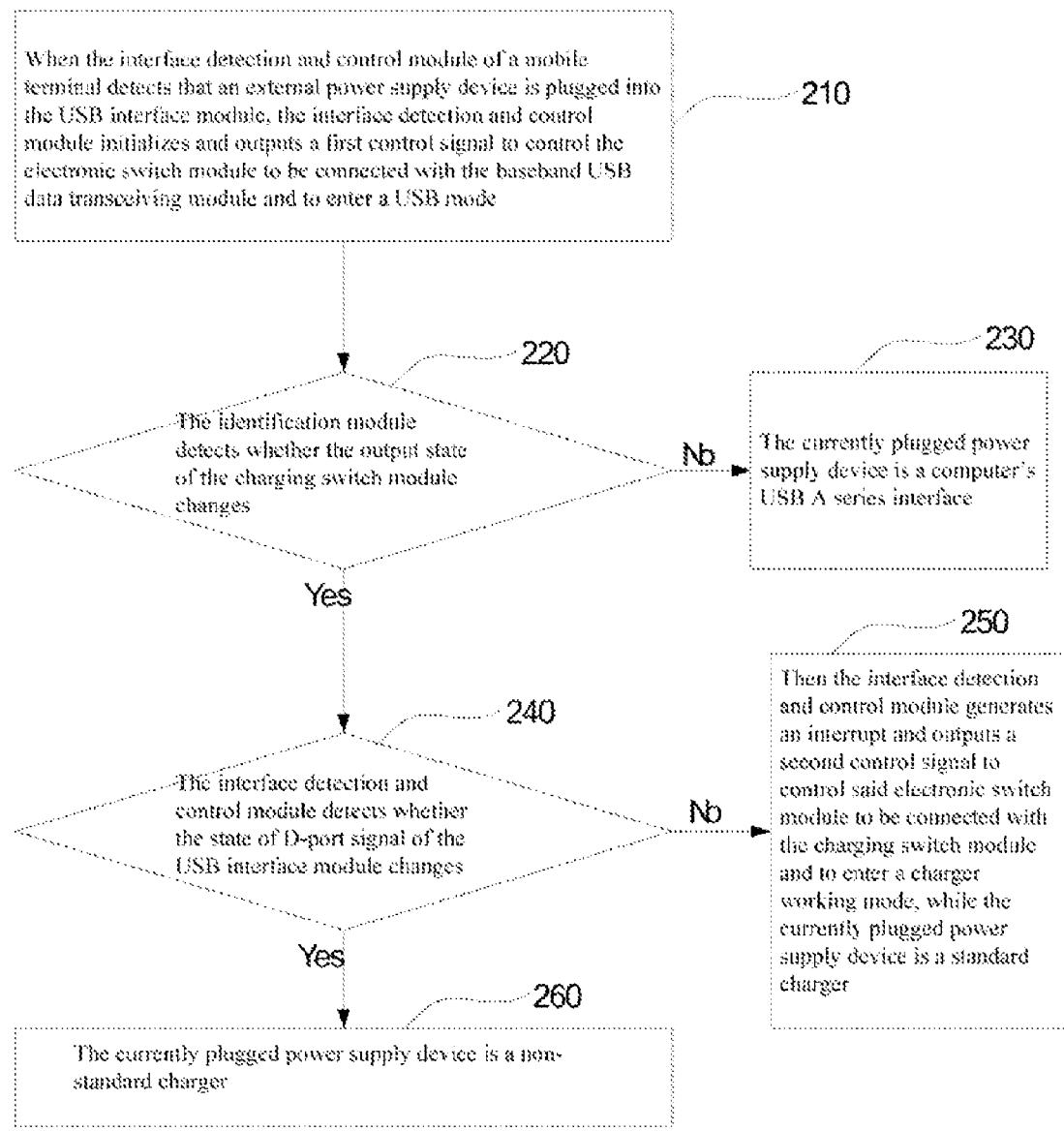
FIG. 4 is a flow chart of the identification method provided in an embodiment of the present invention.

Based on the above principle of the identification device and circuits shown in FIG. 2 and FIG. 3, the flow chart of a method to identify whether a USB or a charger is plugged into a mobile terminal according to the present invention is shown in FIG. 4, comprises the following steps:

Step 210: When the interface detection and control module of a mobile terminal detects that an external power supply device is plugged into the USB interface module, the interface detection and control module initializes and outputs a first control signal to control the electronic switch module to be connected with the baseband USB data transceiving module and to enter a USB mode;

Step 220: The identification module detects whether the output state of the charging switch module changes; if it changes, go to Step 240; otherwise, go to Step 230, Step 230: the currently plugged power supply device is a computer's USB A series interface;

Step 240: The interface detection and control module detects whether the state of D-port signal of the USB interface module changes; if it changes, go to Step 260; otherwise, go to Step 250;

Step 250: Then the interface detection and control module generates an interrupt and outputs a second control signal to control the electronic switch module to be connected with the charging switch module and to enter a charger working mode, while the currently plugged power supply device is a standard charger;

Step 260: the currently plugged power supply device is a non-standard charger.

In summary, the present invention provides a method to identify whether a USB or a charger is plugged into a mobile terminal and an identification device thereof. When an external power supply is plugged in, the identification device makes a terminal to preferentially enter a USB mode, while according to the ultimately detected D-signal state, interrupt responses can be flexibly generated to accurately determine USB or charger plug-in. It can quickly and accurately identify the type of USB or charger plugged into the terminal.

It should be understood that to those skilled in the an, improvements and modifications can be made according to the above description, and all these improvements and modifications shall be encompassed in the scope defined by claims of the present invention.

The invention claimed is:

1. A device for identifying whether a USB or a charger is plugged into a mobile terminal, comprising:
   an interface detection and control module;
   an electronic switch module;
   a charging switch module;
   an identification module; and
   a baseband USB data transceiving module; wherein said interface detection and control module is connected with a USB interface module the interface detection and control module is adapted to detect D-port signal of said USB interface module, said interface detection and control module is adapted to generate interrupt responses according to changes of said D-port signal so as to output a corresponding control signal to the electronic switch module;
   said electronic switch module is connected with said USB interface module, said electronic switch module is adapted to receive input signals from said USB interface module, and said electronic switch module is adapted to select said input signals according to said control signal to connect with said baseband USB data transceiving module or charging switch module;
   said charging switch module is connected with said electronic switch module, said charging switch module is adapted to switch and output an identification signal according to an output signal of said electronic switch module; and
   said identification module is connected with said USB interface module and charging switch module, respectively, said identification module is adapted to identify a type of an external power supply device that is plugged into the mobile terminal according to signal states of said USB interface module and charging switch module.

2. The identification device as set forth in claim 1, further comprising a charging module connected with the USB interface module and charging switch module, respectively, and said charging module is adapted to select a corresponding charging method according to the type of said external power supply device identified by said identification module.

3. The identification device as set forth in claim 2, wherein said electronic switch module is an integrated chip with model number FSUB30L10, pin 1 (S control port) of said FSUB30L10 integrated chip is connected with said interface detection and control module; pin 9 (/OE port), pin 8 (HSD2– port) and pin 5 (GND port) are connected with reference ground; pin 4 is connected with D+ port of the USB interface module; pin 6 is connected with D– port of the USB interface module; and pin 3 (HSD2+ port) and pin 7 (HSD2– port) are connected with said baseband USB data transceiving module.

4. The identification device as set forth in claim 3, wherein said charging switch module comprises a field-effect transistor (FET) with model number 518415 DB, S pole of said 518415 DB FET is connected with pin 2 (HSD1+ port) of said FSUB30L10 integrated chip via a resistor R598, two D poles of said SI8415 DB FET are connected with said identification module and charging module, and G pole of said SI8415 DB FET is connected with reference ground via resistor R11 and resistor R590.

5. The identification device as set forth in claim 1, wherein said electronic switch module is an integrated chip with model number FSUB30L10, pin 1 (S control port) of said FSUB30L10 integrated chip is connected with said interface detection and control module; pin 9 (/OE port), pin 8 (HSD2– port) and pin 5 (GND port) are connected with reference ground; pin 4 is connected with D+ port of the USB interface module; pin 6 is connected with D– port of the USB interface module; and pin 3 (HSD2+ port) and pin 7 (HSD2– port) are connected with said baseband USB data transceiving module.

6. The identification device as set forth in claim 5, wherein said charging switch module comprises a field-effect transistor (FET) with model number SI8415 DB, S pole of said 5I8415 DB FET is connected with pin 2 (HSD1+ port) of said FSUB30L10 integrated chip via a resistor R598, two D poles of said S18415 DB FET are connected with said identification module and charging module, and G pole of said SI8415 DB FET is connected with reference ground via resistor R11 and resistor R590.

7. A method to identify whether a USB or a charger is plugged into a mobile terminal, comprising:

detecting, with an interface detection and control module of the mobile terminal, that an external power supply device is plugged into a USB interface of a module device;

initializing and outputting a first control signal, with the interface detection and control module, to control an electronic switch module connected with a baseband USB data transceiving module and to enter a USB mode;

detecting, with an identification module, whether an output state of a charging switch module changes;

if the output state of the charging switch changes, then a currently plugged power supply device is determined to be a computer's USB A series interface; and if the output state of the charging switch does not change, then the interface detection and control module detects whether a state of D− port signal of the USB interface module changes; if no changes, the interface detection and control module generates an interrupt and outputs a second control signal to control said electronic switch module to be connected with the charging switch module and to enter a charger working mode, while the currently plugged power supply device is a standard charger; if there is a change, the currently plugged power supply device is a non-standard charger.

8. The identification method as set forth in claim 7, wherein said first control signal is a high level signal.

9. The identification method as set forth in claim 7, wherein said second control signal is a low level signal.

10. A method to identify whether a USB or a charger is plugged into a mobile terminal, comprising:

causing the mobile terminal to preferentially enter a USB mode when an external power supply is plugged into the mobile terminal; and generating interrupt responses according to a detected D− signal state to determine whether the USB or the charger is plugged into the mobile terminal, wherein an interface detection and control module is connected with a USB interface module for detecting a D− port signal of the USB interface module and wherein the USB interface module generates interrupt responses according to changes of the D− port signal so as to output a corresponding control signal to an electronic switch module, wherein the corresponding control signal comprises a first control signal and a second control signal.

11. The method as set forth in claim 10, wherein when the interface detection and control module detects that an external power supply device is plugged into the USB interface module, the interface detection and control module initializes and outputs the first control signal to the electronic switch module, causing the terminal to preferentially enter the USB mode.

12. The method as set forth in claim 11, wherein when the interface detection and control module detects changes to the D− port of the USB interface module, the interface detection and control module generates an interrupt and outputs the second control signal to the electronic switch module, such that the mobile terminal enters a charger working mode.

13. The method as set forth in claim 10, further comprising receiving input signals from a USB interface module by an electronic switch module connected with the USB interface module.

14. The method as set forth in claim 13, further comprising selecting the input signals according to a control signal to connect with a baseband USB data transceiving module or a charging switch module, such that the mobile terminal enters a USB module or a charger working mode.

15. The method as set forth in claim 10, further comprising connecting a charging switch module with an electronic switch module for switching and outputting an identification signal according to an output signal of the electronic switch module.

16. The method as set forth in claim 10, further comprising identifying a type of external power supply device according to signal states of a USB interface module and a charging switch module.

* * * * *